United States Patent [19]
Baldini et al.

[11] Patent Number: 5,273,262
[45] Date of Patent: Dec. 28, 1993

[54] HYDRAULIC MOUNT WITH LOW AMPLITUDE, LOW-TO-MEDIUM FREQUENCY VIBRATION ISOLATION

[75] Inventors: Todd H. Baldini, Dayton; John F. Hoying, Centerville; Michael J. Vendely, Dayton, all of Ohio

[73] Assignee: General Motors Corporation, Detroit, Mich.

[21] Appl. No.: 898,644

[22] Filed: Jun. 15, 1992

[51] Int. Cl.$^5$ ............................................... F16M 5/00
[52] U.S. Cl. ........................ 267/140.13; 248/562; 248/636
[58] Field of Search .................... 267/140.13, 140.11, 267/140.12, 140.14, 140.15; 248/562, 636

[56] References Cited

U.S. PATENT DOCUMENTS

| | | | |
|---|---|---|---|
| 4,583,503 | 4/1986 | Kumagai et al. | 123/192 R |
| 4,664,363 | 5/1987 | Gold et al. | 267/140.13 |
| 4,711,206 | 12/1987 | Audrä et al. | 267/140.13 |
| 4,739,978 | 4/1988 | Bodin | 267/140.13 |
| 4,783,062 | 11/1988 | Hamberg et al. | 267/140.1 |
| 4,783,063 | 11/1988 | Probst et al. | 267/140.13 |
| 4,802,658 | 2/1989 | Ushijima et al. | 267/140.13 |
| 4,834,349 | 5/1989 | Arai et al. | 267/140.1 |
| 4,932,636 | 6/1990 | Phillips et al. | 267/140.13 |
| 5,054,752 | 10/1991 | Tabata | 267/140.12 |
| 5,060,917 | 10/1991 | DuBos et al. | 267/140.13 |

FOREIGN PATENT DOCUMENTS

| | | | |
|---|---|---|---|
| 1062632 | 3/1986 | Japan | 267/140.13 |
| 3203940 | 8/1988 | Japan | 267/140.13 |
| 3210430 | 9/1988 | Japan | 267/140.13 |
| 2026336 | 1/1990 | Japan | 267/140.13 |

Primary Examiner—Robert J. Oberleitner
Assistant Examiner—Alfred Muratori
Attorney, Agent, or Firm—Kevin M. Hinman

[57] ABSTRACT

A hydraulic mount assembly includes a pair of mounting members connected together through a hollow elastomeric body. This hollow body is closed by a resilient diaphragm so as to form a cavity for a damping liquid. A partition divides the cavity into a primary chamber formed between the partition and the hollow body and a secondary chamber formed between the partition and the diaphragm. The partition also includes a primary (damping) track and a secondary (dynamic rate reducing) track providing fluid communication between the chambers. A decoupler is held for limited reciprocating movement in an annular groove in the secondary track. In operation, high amplitude vibratory inputs seat the decoupler forcing damping fluid to flow between the primary and secondary chambers through the damping track. The resulting high level of damping and high dynamic rate serve to suppress the vibrations and control engine movement/noise. In response to low amplitude and particularly low-to-medium frequency vibratory inputs, the decoupler remains unseated, allowing damping fluid to flow around the decoupler and through the secondary track. The resulting fluid inertial forces create a low dynamic rate and a soft mount for better vibration and noise isolation. At high frequency and low amplitude, such as during normal idle, the decoupler reciprocates normally, thus avoiding damping action.

1 Claim, 2 Drawing Sheets

HYDRAULIC MOUNT WITH LOW AMPLITUDE, LOW-TO-MEDIUM FREQUENCY VIBRATION ISOLATION

TECHNICAL FIELD

The present invention relates generally to hydraulic mount assemblies for vibration damping and, more particularly, to a fully passive hydraulic mount assembly designed to provide variable damping characteristics as well as a dynamic rate decrease at a desired frequency so as to soften the mount for improved isolation, particularly of low amplitude, low-to-medium frequency vibrations.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. 4,588,173 to Gold et al., issued May 13, 1986, entitled "Hydraulic-Elastomeric Mount" and assigned to the assignee of the present invention.

The hydraulic mount assembly of this prior invention includes a reinforced, hollow rubber body that is closed by a resilient diaphragm so as to form a cavity. This cavity is partitioned by a plate into two chambers that are in fluid communication through a relatively large central opening in the plate. The first or primary chamber is formed between the plate and the body. The secondary chamber is formed between the plate and the diaphragm.

A decoupler is positioned in the central opening of the plate and reciprocates in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes as occur at generally higher frequencies, fluid flow between the chambers is substantially avoided and undesirable hydraulic damping is eliminated. In effect, this freely floating decoupler is a passive tuning device.

In addition to the relatively large central opening, an orifice track with a smaller, restricted flow passage is provided extending around the perimeter of the orifice plate. Each end of the track has an opening. One opening communicates with the primary chamber. The other opening communicates with the secondary chamber. The orifice track provides the hydraulic mount assembly with another passive tuning component, and when combined with the freely floating decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. Large amplitude vibrating input, such as heavy engine loading during sudden accelerations or panic stops, produces high velocity fluid flow through the orifice track, and accordingly a high level of damping force, and desirable smoothing action. A third or intermediate operational mode of the mount occurs during medium amplitude inputs experienced in normal driving and resulting in lower velocity fluid flow through the orifice track. In response to the decoupler switching from movement in one direction to another in each of the modes a limited amount of fluid can bypass the orifice track by moving around the edges of the decoupler and through the central opening thereby smoothing the transition.

This basic mount design has proved quite successful, and represents a significant advance over the prior art engine mounts, particularly those of the solid rubber type. More specifically, hydraulic mounts provide a more favorable balance of load support and damping control. It should be appreciated, however, that additional improvement in operating characteristics is still possible.

To this end, more recent developments in hydraulic mount technology have lead to the advent of electronic control of the dynamic characteristics of the mount. Active, rather than passive, control allows more efficient and effective isolation of vibrations and suppression of noise. A previously developed hydraulic mount of the active control type is disclosed in U.S. Pat. No. 4,783,062 to Hamberg et al., issued Nov. 8, 1988, entitled "Electronic Hydraulic Mount/Internal Solenoid" and assigned to the assignee of the present invention.

In this mount assembly, the partition includes three passages connecting the primary and secondary chambers. One of the passages is a central opening but no decoupler is specified in the preferred embodiment. Two additional passages of varying length form orifice tracks providing unique damping characteristics tuned to isolate selected frequencies of vibration and provide the desired engine control. A sliding gate extends across the entry to the central opening and the two passages. This gate is displaceable to direct the flow of fluid between the primary and secondary chambers through a selected passage or passages in the partition. A solenoid actuator mounted on the partition includes multiple electric coils that allow the positive positioning of the gate. A control circuit with on-board transducers is provided to monitor vehicle operating and road conditions. A microprocessor acts in response to the sensed conditions causing the necessary sequential energization of the series of coils to properly position the gate and provide the desired damping characteristics.

The mount assembly described in the Hamberg et al. patent is particularly adapted for tuning to the instant resonance frequencies characteristic of the vehicle component being damped. This allows the mount assembly to more efficiently and effectively isolate vibrations and suppress noise over a wide range of vehicle operating and road conditions.

While the mount assembly disclosed in the Hamberg et al. patent may be very effectively tuned to provide the desired damping and dynamic rate characteristics over a wide range of vehicle operating conditions, still further improvements in mount assembly design are possible. More particularly, it is desirable to provide a mount assembly that relies upon passive tuning features to provide operating and performance characteristics substantially as effective as those provided by an active tuning system. Such a passive, mechanically actuated mount assembly is significantly less expensive to produce requiring neither electrical nor pneumatic control. Additionally, no sensors for monitoring operating conditions are required.

Further, it is particularly desirable to provide a mount assembly with a reduced or soft dynamic rate over a selected frequency range to minimize annoying relatively low amplitude/low-to-medium, frequency engine vibrations that would otherwise be transmitted to the passengers in the vehicle. Such vibrations are commonly produced by idling engines and are particularly noticeable and annoying to passengers when the vehicle is stationary.

SUMMARY OF THE INVENTION

Accordingly, it is a primary object of the present invention to provide an improved hydraulic mount assembly of fully passive operation that may be tuned for improved suppression of low amplitude, low-to-medium frequency engine idle vibrations and noise while maintaining the desired damping to control the motion of the engine under all operating conditions.

Another object of the invention relates to providing a mount assembly designed to utilize fluid inertial forces to create a low dynamic rate and stiffness customized to provide the desired isolation of low amplitude, low-to-medium frequency resonant vibrations between 10 and 200 Hz characteristic of the particular operating component.

Still another object of the present invention is to provide a hydraulic mount assembly incorporating primary and secondary orifice tracks with diverse damping characteristics and a reciprocating decoupler in the secondary track. A related objective is to provide a tunable mount assembly by carefully selecting the length and cross-sectional area of the two tracks. By passively tuning in this manner, the important goals of efficiently and effectively isolating vibrations, suppressing noise and dampening undesired motion over a broad range of vehicle operating conditions are to be achieved. Further, this is accomplished in a manner approaching the effectiveness of more expensive active tuning systems.

Additional objects, advantages and other novel features of the invention will be set forth in part in the description that follows, and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount assembly for an operating component of a vehicle is provided. The mount assembly is particularly adapted to produce variable damping characteristics that are passively tuned to provide the necessary vibration isolation and damping of component displacements ideally suited for smooth vehicle operation.

The preferred embodiment of the mount assembly selected to illustrate the invention includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid-filled cavity into two distinct chambers. The primary chamber is formed between the partition and the interior wall of the hollow body. The secondary chamber is formed between the partition and the interior wall of the diaphragm.

The partition further includes a primary or damping orifice track, a secondary or dynamic rate reducing track and a decoupler captured in the secondary track. This decoupler freely reciprocates within a mounting cavity formed by an annular groove in the partition at a midpoint along the track.

In response to relatively high amplitude, low frequency vibrational inputs such as occur, for example, during hard cornering or acceleration of the vehicle, this decoupler is effectively seated. This serves to seal the secondary or dynamic rate reducing track. Accordingly, damping fluid is forced to pass between the primary and secondary chambers of the mount assembly substantially exclusively through the damping track. The relatively restricted flow of fluid through the damping track furnishes a high dynamic rate and dampens the vibrations, thereby ideally controlling the engine displacement and suppressing the vibrations.

More particularly, it should be appreciated that the column of damping fluid within the damping track resonates at a particular frequency that is a function of the cross-sectional area and length. Accordingly, the damping track may be sized and thereby custom tuned to provide the desired damping response for controlling the displacements characteristic of the particular operating component carried on the mount assembly.

In contrast, in response to relatively low amplitude, low-to-medium frequency vibrational inputs, the decoupler remains unseated. This allows more damping fluid to pass around the decoupler and through the dynamic rate reducing track between the primary and secondary chambers. In order to provide smooth vehicle operation, the dynamic rate reducing track is specifically sized and shaped so as to be tuned to provide a dynamic rate decrease or dip at a specific frequency, such as, for example, between 20 and 30 Hz.

More specifically, for low amplitude, low-to-medium frequency vibratory inputs, fluid communicating between the primary and secondary chambers passes almost exclusively through the dynamic rate reducing track, as this represents the path of least resistance. As a result, the damping effect is significantly reduced. Further, it should be appreciated that the column of fluid resonating through the secondary track has a characteristic mass and acceleration that serve to effectively reduce the dynamic rate and hence the stiffness of the mount below that of the strictly rubber component of the mount alone. As a result, the relatively soft mount provides good isolation of the low amplitude, low-to-medium frequency noise commonly produced in a vehicle by an idling engine. As these vibrations are particularly noticeable when a vehicle is stationary, the enhanced isolation effect significantly increases customer satisfaction with the vehicle.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Figure 1:
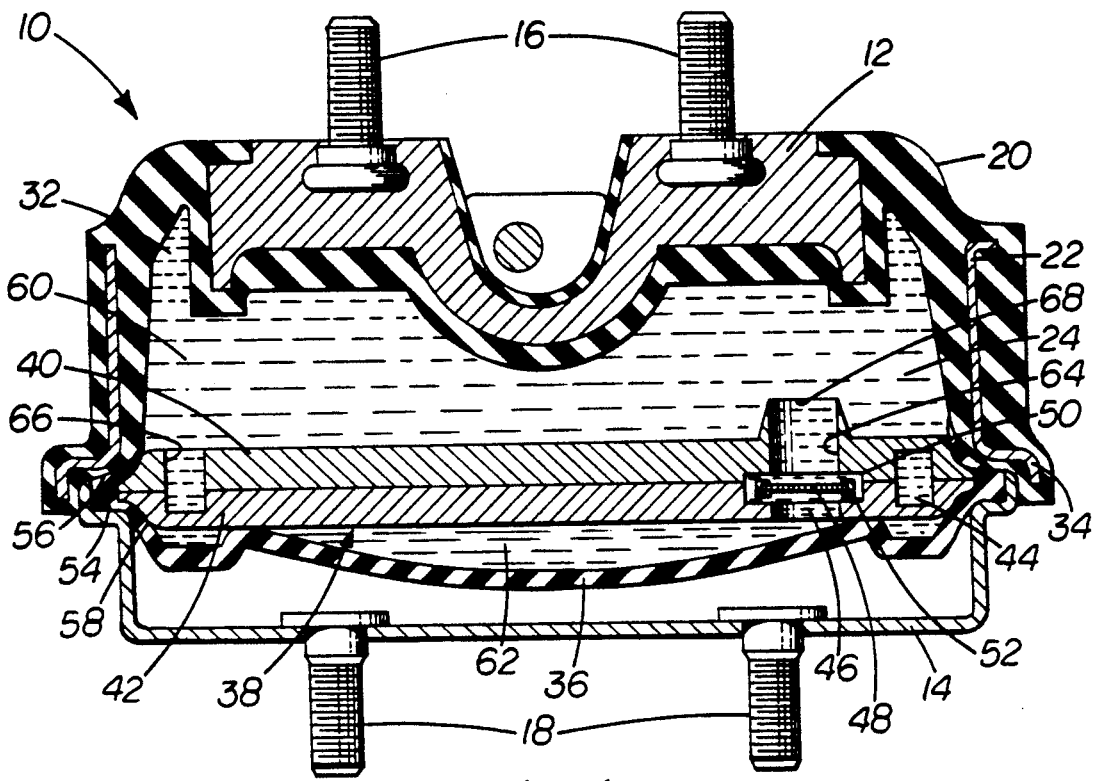
FIG. 1 is a cross-sectional view of the hydraulic mount assembly of the present invention.

Reference will now be made in detail to the present preferred embodiment of the present invention, an example of which is illustrated in the accompanying drawing.

DETAILED DESCRIPTION OF THE INVENTION

The improved hydraulic-elastomeric mount assembly 10 of the present invention is particularly adapted for mounting an internal combustion engine and/or transmission in a vehicle. The dynamic characteristics of the mount assembly 10 are tuned to meet the needs of the specific application. As a result, the desired dynamic rate best suited to isolate a particular range of vibration/noise conditions may be obtained. Further, this is accomplished while maintaining the necessary high amplitude damping for engine control.

The mount assembly 10 includes a cast aluminum mounting member 12 and stamped sheet metal mounting member 14. The mounting members 12 and 14 each have a pair of studs 16, 18, respectively. The studs 16, 18 project outwardly from the mounting members 12, 14 for attachment respectively to an engine (not shown) and an engine supporting cradle or frame of a vehicle (not shown). A hollow elastomeric body 20 interconnects the mounting members 12, 14. The body 20 is constructed of natural or synthetic rubber. More specifically, the body 20 may be molded to and about the mounting member 12 and to both the interior and exterior of an oval-shaped stamped sheet metal retainer 22. The body 20 is configured to form a hollow cavity 24 for receiving a damping liquid, which is a commercial engine antifreeze coolant.

Voids 32 are also provided in the body 20. These voids 32 assist in providing directional dynamic rate control within the elastomeric body 20 and are part of the damping liquid cavity 24. As is known in the art, such voids 32 are useful in isolating certain internal combustion engine vibrations.

Together, the mounting member 12, elastomeric body 20 and metal retainer 22 form a first subassembly or cover of the mount assembly 10. The retainer 22 includes an outwardly projecting collar 34 at its lower periphery. The collar 34 is formed to receive a second subassembly or base. This second subassembly comprises the mounting member 14, an elastomeric diaphragm 36 of natural or synthetic rubber and a partition 38.

Figure 2:
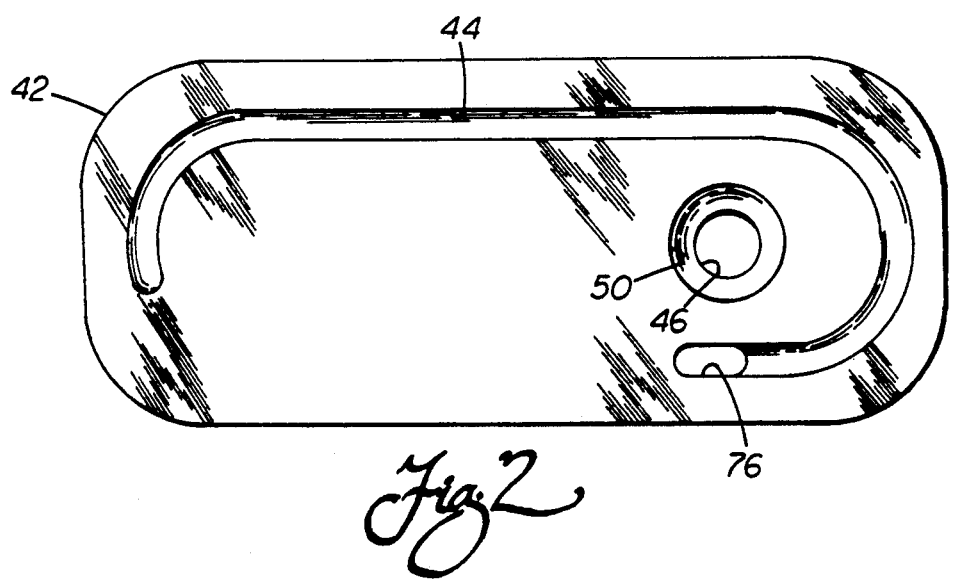
FIG. 2 is a plan view of the top face of the bottom plate of the partition showing the damping and dynamic rate reducing tracks.

The partition 38 is formed from a pair of upper and lower cooperating plates 40, 42. These die cast metal or plastic plates 40, 42 have matching peripheries. The plates 40, 42 span the cavity and cooperate to define a primary or damping orifice track 44 and a secondary or dynamic rate reducing orifice track 46 (see also FIG. 2 illustrating the lower portion).

A freely reciprocating decoupler 48 is provided at a midpoint in the secondary or dynamic rate reducing track 46. The decoupler 48 controls the flow of fluid depending upon the amplitude and frequency of vibratory inputs to the mount assembly 10. More particularly, as shown, the decoupler 48 is mounted for limited up and down reciprocal movement in an annular groove 50 that is formed between the partition plates 40, 42. A cushioning ring 52 formed of natural or synthetic rubber may be molded to the decoupler 48 about the perimeter thereof to prevent chatter and improve seating of the decoupler.

The elastomeric diaphragm 36 includes an annular rim section 54 having a radially inwardly facing internal groove formed between upper and lower shoulders 56, 58, respectively. The shoulders 56, 58 are flexible so as to receive the periphery of the partition 38. Thus, the periphery of the partition 38 is sealingly engaged by the shoulders 56, 58 on opposite sides of the groove.

The lower mounting member 14 is formed with a collar to receive the rim 54 of the diaphragm 36. The collar of the mounting member 14 fits within the collar 34 of the retainer 22. As is known in the art, tabs (not shown) may be provided on the collar 34 and bent over to retain the whole mount assembly 10 together.

The elastomeric diaphragm 36 closes the elastomeric body 20 so as to form therewith the closed damping cavity 24. This cavity 24 is divided by the partition 38 into the primary chamber 60 enclosed by the elastomeric body 20 and the secondary chamber 62 enclosed by the diaphragm 36.

As best appreciated from reviewing FIG. 1, a cylindrical extension 64 is mounted to the upper partition plate 40 in order to adjust the volume and cross-sectional area of the dynamic rate reducing track 46. As described in greater detail below, this allows the resonance frequency of the column of damping fluid within this track 46 to be tuned to provide the desired operating characteristics for the mount assembly 10.

An opening 66 is provided in the upper plate 40 at one end of the primary damping track 44 through which the track communicates with the primary chamber 60. A similar opening 68 is provided in the cylindrical extension 64 of the secondary track 46. An opening 76 is provided in the lower plate 42 at the opposite or lower end of the primary track 44 for communication with the secondary chamber 62. Of course, the damping track 44 may also be formed to a selected length and/or cross-sectional area so as to provide the mount with desired passive damping characteristics.

In operation, the mount assembly 10 of the present invention passively provides two distinct operating modes, the mode selected being determined by the amplitude of the vibratory input. In response to relatively high amplitude and particularly low frequency vibrational inputs such as occur, for example, during hard cornering or acceleration of the vehicle, the primary chamber 60 is initially subjected to a significant compression and increased pressure. In response, the decoupler 48 is seated against the lower partition plate 42. This serves to seal the secondary or dynamic rate reducing track 46. Accordingly, damping fluid is forced to pass from the primary chamber 60 on the relatively high pressure side of the partition 38 through the primary damping track 44 to the secondary chamber 62 on the relatively low pressure side. As this occurs, it should be appreciated that the diaphragm 36 expands to increase the volume of the secondary chamber 62 and accommodate the flow of damping fluid.

As the operating component rebounds, the elastomeric body 20 is placed in tension and the primary chamber 60 is effectively expanded. As a result, pressure is relieved in the primary chamber 60 and the higher fluid pressure in the secondary chamber 62 seats the decoupler 48 against the upper partition plate 40. Accordingly, as the resilient memory of the diaphragm 36 forces damping fluid from the secondary chamber 62, the fluid is forced to travel through the damping track 44 back into the primary chamber 60. This cycle continues until the vibrational input is fully damped and suppressed.

Of course, it should be appreciated that the restricted flow of fluid through the damping track 44 furnishes a high dynamic rate that serves to dampen the vibrations and thereby control the engine movement and bring about quick suppression. The column of damping fluid within the damping track 44 resonates at a particular tuned frequency. As indicated, this sizing and custom tuning provides the desired damping response for controlling the displacements characteristic or resonant with the particular operating component.

In accordance with an important aspect of the invention, a second mode of passive operation is provided in response to relatively low amplitude, and particularly low-to-medium frequency vibratory inputs of, for example, 10–200 Hz, such as are common during engine idle operation. More specifically, the decoupler 48 remains unseated, allowing damping fluid to pass around it and through the secondary or dynamic rate reducing track 46. As this track 46 is designed to be less restrictive than the damping track 44, there is a lower resistance to flow. Thus, under low amplitude, low-to-medium frequency vibratory conditions, fluid flow between the chambers 60, 62 is effectively limited to that provided through the secondary track 46.

Since the secondary track 46 is sized an shaped, and thereby tuned to provide a dynamic rate decrease or dip at a specific frequency between, for example, 20 and 30 Hz, the damping effect is significantly reduced. As a result, a relatively soft mount provides good isolation of the low amplitude, low-to-medium frequency noise.

To explain, the fluid inertial forces of the dynamic rate reducing track 46 are designed to reduce the overall stiffness of the mount. The force transmitted through a hydraulic mount is equal to $(S_R \times D) + (F_M \times F_A)$ wherein: $S_R$ = the rubber dynamic stiffness, D = displacement, $F_M$ = fluid mass, and $R_A$ = fluid acceleration. From this formula and the realization that the fluid component of the equation is substantially out of phase with the rubber component, it should be appreciated that if the fluid acceleration is large, the mount exhibits a relatively reduced dynamic rate and stiffness.

The controlled variations of fluid acceleration/velocity create a mount having a soft dynamic rate at the desired frequency and/or range of frequencies. More particularly, the soft dynamic rate is created only in response to vibratory inputs characteristic of an idling engine. Thus, it is possible to isolate these troublesome resonant vibrations when engine control is not a critical concern.

Under all other engine operating conditions, the normal dynamic rate and stiffness of the mount assembly 10 is maintained at the higher levels through the seating of the decoupler 48, thereby assuring performance of the primary function of engine control.

Figure 3:
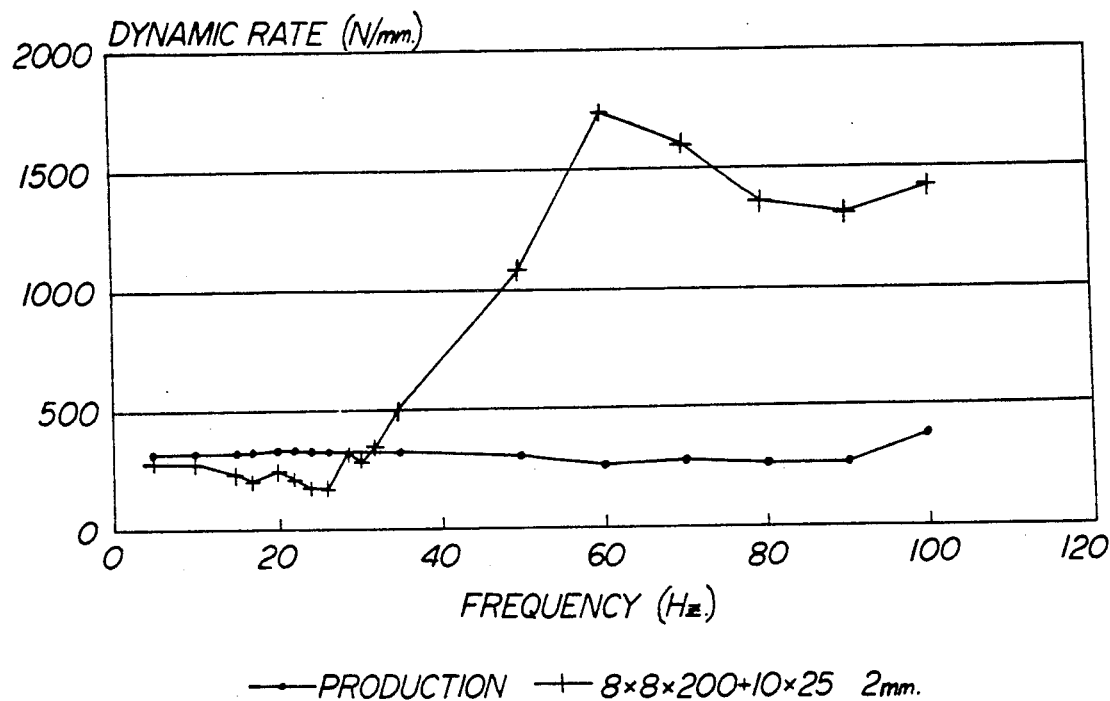
FIG. 3 is a graphical representation showing the favorable dynamic rate provided by the mount assembly of the present invention when compared to the standard production mount assembly referred to above, and incorporating only a damping orifice track and a decoupler opening with decoupler.
Figure 4:
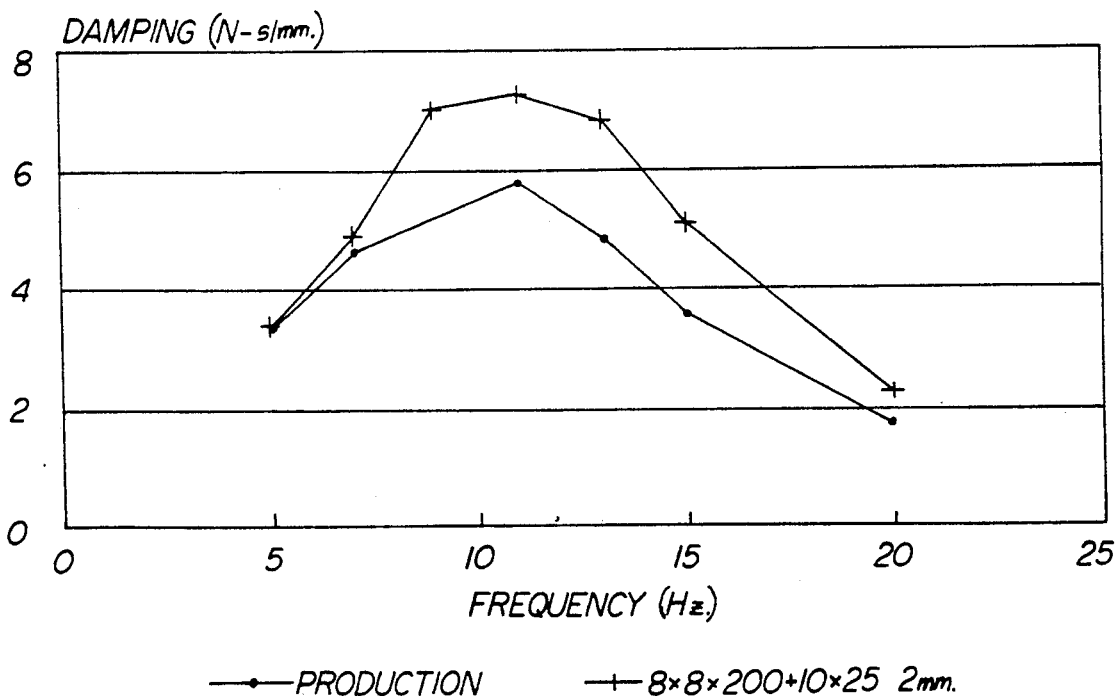
FIG. 4 is a graphical representation comparing the damping provided by the mount assembly of the present invention when compared to the standard production mount.

The ability to tune the operating characteristics of the mount assembly 10 of the present invention is best appreciated from viewing FIGS. 3 and 4. FIG. 3 graphically compares the dynamic rate of the mount assembly 10 with a production mount incorporating a single damping track and decoupler opening with a single reciprocating decoupler. It should be appreciated, that the mount assembly 10 of the present invention, including a 10 mm diameter by 25 mm length dynamic rate reducing track 46 and a decoupler with 2 mm of overall reciprocal movement, provides a significant rate decrease under conditions of a −1200 Newtons preload and a vibrational amplitude of 0.1 mm. This is particularly true in a range of frequencies between substantially 18 and 25 Hz, where particularly significant enhanced isolation of engine idle vibrations occurs.

Further, it should be appreciated that enhanced isolation of engine idling noise is also achieved while maintaining good damping characteristics for engine control. As shown in FIG. 4, for a preload of −1200 Newtons and a vibrational amplitude of 0.650 mm, the mount assembly 10 of the present invention provides significantly increased damping over the production mount assembly throughout the range of 5 to 20 Hz when incorporating a primary damping track of 8 mm width, 8 mm height and 200 mm length. Increased damping serves to quickly suppress engine movements, thereby maintaining the engine in complete control under all normal vehicle operating conditions.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in the various embodiments and with various modifications as is suited to the particular use contemplated. All such modifications and the variations are within the scope of the invention as determined by the appended claims when interpreted in accordance with breadth to which they are fairly, legally and equitably entitled.

We claim:

1. A hydraulic mount assembly for an operating component of a vehicle, comprising:

a pair of mounting members;

a hollow body connected to said mounting members;

a resilient diaphragm closing said hollow body and forming therewith a closed cavity that is filled with a damping fluid;

means for partitioning said cavity into a primary chamber and a secondary chamber enclosed by said diaphragm;

only first and second fluid paths permitting fluid communication between said primary and secondary chambers;

said first path formed as a damping track in said partitioning means;

said second path formed as a dynamic rate reducing track bounded partially by a cylindrical extension on said partitioning means, the dynamic rate reducing track having a diameter of substantially 10 mm and a length of substantially 25 mm in said partitioning means, damping fluid in said dynamic rate reducing track forming a fluid column in response to low amplitude, low-to-medium frequency vibrations having a mass and acceleration sufficient to reduce a dynamic rate of the mount in a frequency range between 20 and 30 Hz so as to provide for improved vibration isolation; and a decoupler captured in said dynamic rate reducing track, said decoupler seating in response to high amplitude, low frequency vibrations, thereby sealing said dynamic rate reducing track and forcing fluid flow between said primary and secondary chambers through said damping track to provide component control.

* * * * *